United States Patent
Wake

(10) Patent No.: US 6,829,976 B2
(45) Date of Patent: Dec. 14, 2004

(54) DIAPHRAGM FOR A BRAKE BOOSTER

(75) Inventor: Masato Wake, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 153 days.

(21) Appl. No.: 10/294,629

(22) Filed: Nov. 15, 2002

(65) Prior Publication Data

US 2004/0118275 A1 Jun. 24, 2004

(51) Int. Cl.$^7$ ............................................. B60T 13/569
(52) U.S. Cl. .................................................... 91/376 R
(58) Field of Search ........................... 91/369.2, 376 R, 91/368

(56) References Cited

U.S. PATENT DOCUMENTS

| | | | |
|---|---|---|---|
| 3,037,487 A | * 6/1962 | Brooks | ...................... 91/376 R |
| 3,083,698 A | 4/1963 | Pfeifer et al. | |
| 3,158,930 A | 12/1964 | Sanders et al. | |
| 4,270,353 A | 6/1981 | Danne et al. | |
| 4,283,992 A | * 8/1981 | Wilson | ...................... 91/369.4 |
| 4,338,854 A | 7/1982 | Margetts | |
| 4,434,707 A | 3/1984 | Hachiro | |
| 4,487,022 A | * 12/1984 | Kytta | ........................ 60/547.1 |
| 4,885,982 A | * 12/1989 | Shimamura | ................. 60/547.1 |
| 5,207,142 A | 5/1993 | Hewitt | |
| 5,233,908 A | * 8/1993 | Gautier et al. | ............. 91/376 R |
| 5,320,024 A | 6/1994 | Wagner et al. | |
| 5,372,409 A | * 12/1994 | Farr | ............................. 303/20 |
| 6,390,567 B1 | 5/2002 | Hurlbutt | |

* cited by examiner

Primary Examiner—Thomas E. Lazo
(74) Attorney, Agent, or Firm—Leo H McCormick, Jr.; Warren Comstock

(57) ABSTRACT

A brake booster (10) having a housing defined by joining a substantially circular first shell (12) to a second shell (14) to compress a first bead (100,200) on a diaphragm (102,202) secured to a movable wall (76) and seal an interior thereof from the surrounding environment. The movable wall (76) includes a hub (44) with a disc (74) having an annular groove (70) located adjacent a peripheral surface (72) for receiving a second bead (104,204) on the diaphragm (102, 202). The diaphragm (102,202) is characterized by a resulting cylindrical body (116,216) with a first section (215) that transitions from the first bead (100,200) and a second section (217) that transitions from the second bead (104,204). The first (100,200) and second (104,204) beads each have an initial oval shape that is stretched into a circular shape for respective retention between the first (12) and second (14) shells and annular groove (70) in sealing a front chamber (50) from a rear chamber (52).

10 Claims, 3 Drawing Sheets

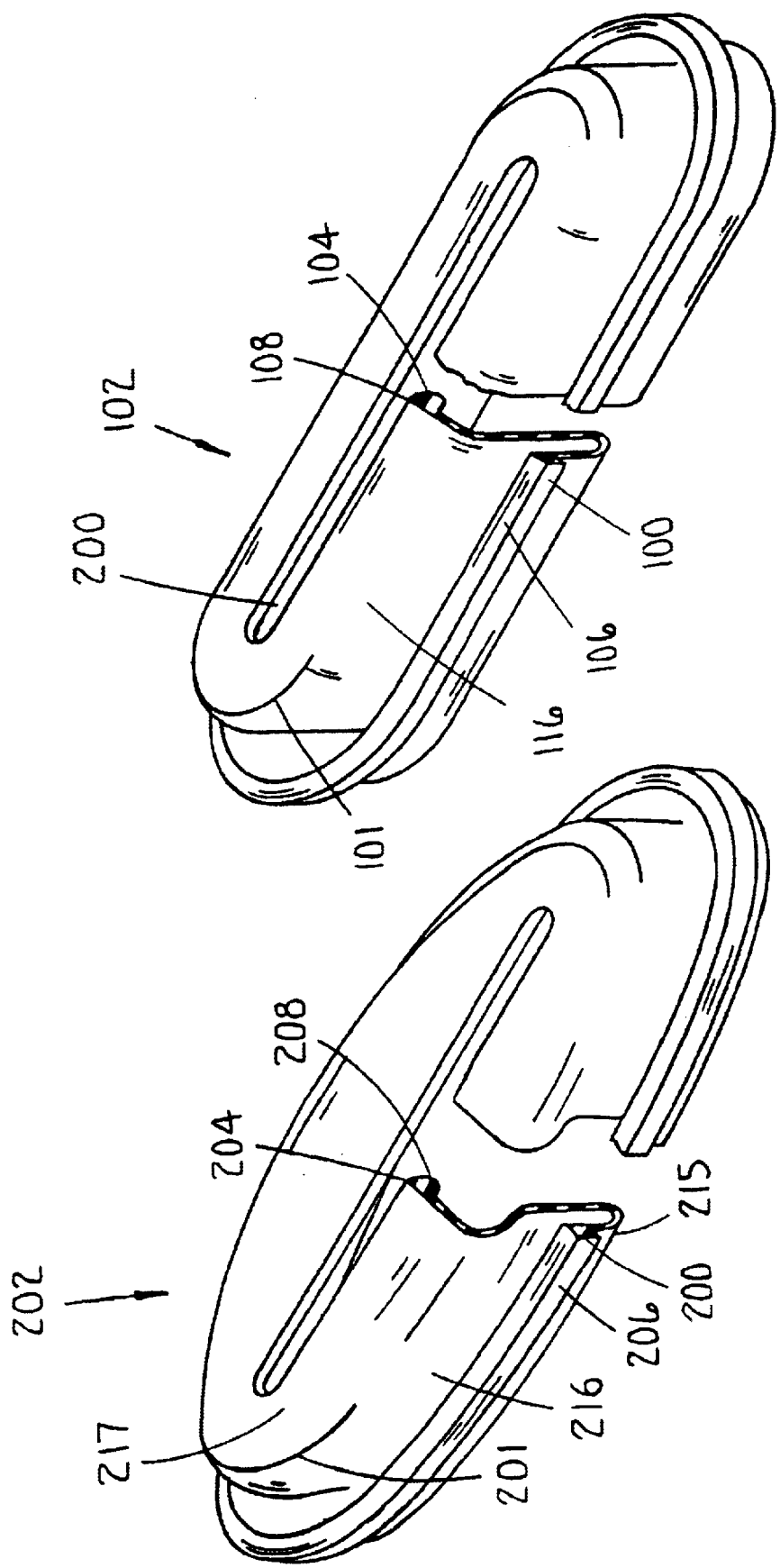

DIAPHRAGM FOR A BRAKE BOOSTER

This invention relates to the manufacture of an oval diaphragm and its use in an essentially circular housing of a brake booster.

BACKGROUND OF THE INVENTION

U.S. Pat. Nos. 3,083,698, 3,158,930 and 6,390,567 are typical of brake boosters manufactured through a well known methods. In such manufacture an end surface on a first shell is crimped or deformed by cutting or shearing tabs that engage a surface on a second shell to join a first shell with a second shell and define a unitary structure. In joining the first shell to the second shell, a first bead of a diaphragm associated with a movable wall is retained between the first shell and the second shell while a second bead is connected to the movable wall to separate the interior into a front chamber from a rear chamber.

The diaphragm in such brake boosters is normally constructed in a mold through an injection molding process. The mold will have a diameter wherein material flows from a center port toward the radius such that a uniform cross section is produced without a seam or mold line. The first bead and second bead are located in the mold in accordance with a desired diameter size for a brake booster with the first bead being at an outer peripheral position and the second bead being at an radius from the center of the mold. After the molding, the resulting diaphragm is trimmed to the desired size such that the first and second beads are now respectively located on inner and outer peripheral surfaces. Unfortunately, such molding process may result in substantial scrap depending on the position of the second which can be located on a shoulder of a hub of the movable wall or on in a groove on a backing plate for the movable wall. In any case, radius from the center of the molded disc to the second bead represents scrap and a waste of material.

SUMMARY OF THE INVENTION

A primary object of the present invention is to manufacture a diaphragm for a brake booster wherein an inner bead has an initial oval shape that is stretched into a circular shape for insertion into an annular groove of a movable wall to isolate a front chamber from a rear chamber.

According to this invention, a brake booster has a first shell joined to a second shell by deforming a first peripheral surface on the first shell with respect to a second peripheral surface on the second shell to define a housing. A diaphragm has a first bead located between the first and second peripheral surfaces and a second bead secured to a movable wall such that the interior of the housing is divided into a front chamber and a rear chamber that are sealed with respect to the surrounding environment. The movable wall carries a valve arrangement that initially responds to a brake input to interrupt communication between the front chamber and the rear chamber and thereafter open communication between the rear chamber and the surrounding environment to create a pressure differential across the movable wall. The pressure differential acts on the movable wall to develop an output force for effecting a brake application. The movable wall is characterized by a disc having an annular groove located adjacent a peripheral outer surface while the diaphragm is characterized by a cylindrical body with a first section that transitions into a first bead on a first end and a second section that transitions into a second bead on a second end. The first bead and the second bead each have an initial oval shape that is stretched into a circular shape for respective retention between the first and second peripheral surfaces annular groove to define a connection between the movable wall and the first and second peripheral surfaces in sealing the front chamber from the rear chamber.

An advantage of this invention resides in a brake booster having a diaphragm wherein at least an inner bead having an oval shape is stretched into a circular shape for retention in an annular groove to define a sealed joint between the diaphragm and a movable wall.

A still further advantage of this invention resides in a method of manufacture of a diaphragm with a cylindrical central section that transitions into an oval section containing a bead such that the diaphragm is trimmed adjacent the bead and thereafter stretched into a circular shape for retention in a annular groove in a movable wall.

A still further advantage of the present invention resides in a method of manufacturing a diaphragm wherein scrap is reduced by defining an inner bead with an oval shape that is stretched into a circular shape for retention in a groove in a movable wall.

BRIEF DESCRIPTION OF THE DRAWINGS

FIG. 2 is a perspective illustration of the diaphragm of FIG. 1 having a sectional view through the diaphragm;

FIG. 5 is a view of a secondary embodiment of a diaphragm for the brake booster of FIG. 1.

DETAILED DESCRIPTION

Figure 1:
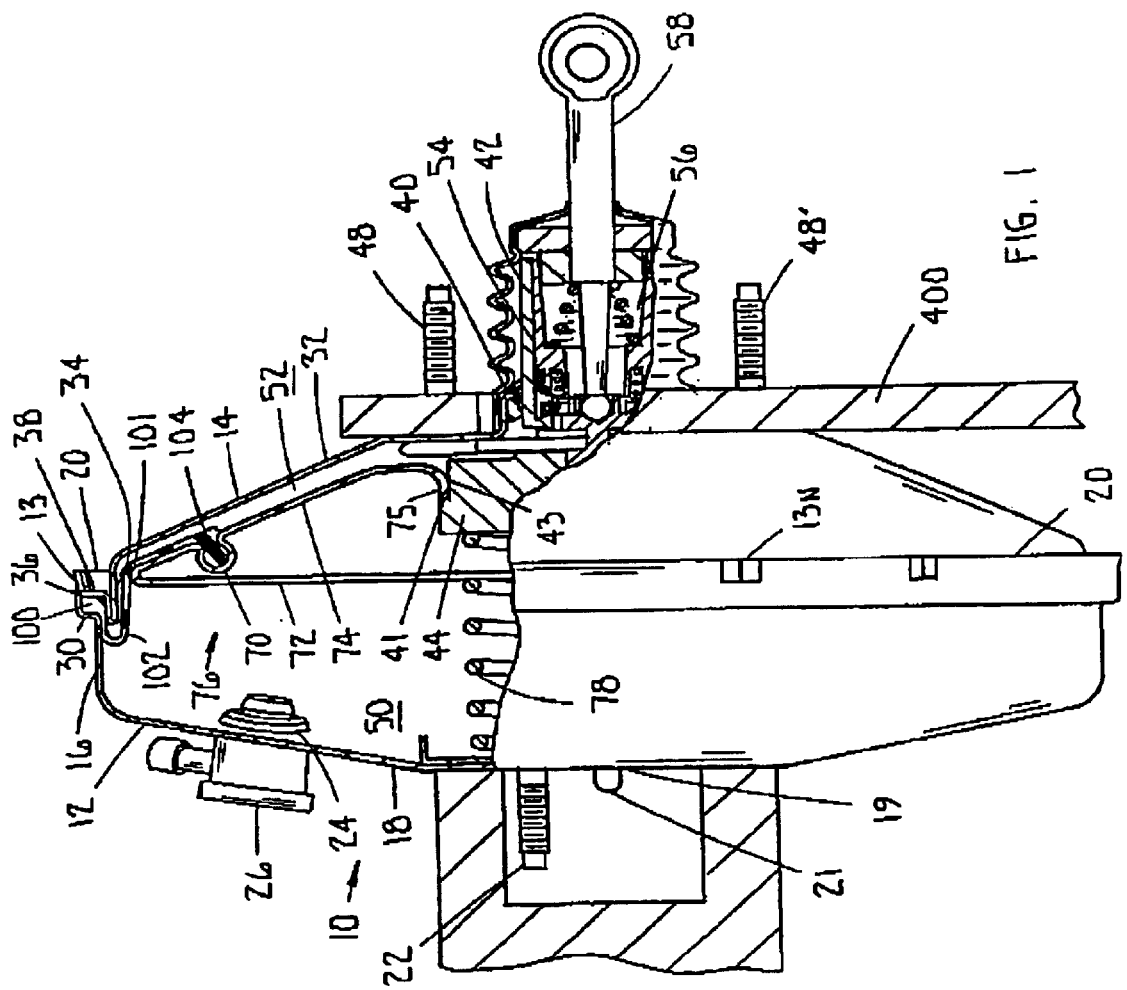
FIG. 1 is an illustration of a brake booster having a partial sectional view of a diaphragm and movable wall made according to the principles of this invention.

FIG. 1 illustrates a brake booster 10 having a housing that has an essentially circular shape created by joining a first shell 12 to a second shell 14.

The first shell 12 has a cylindrical body 16 with a closed end 18 and an opened end 20. The closed end 18 has an axial opening 19 through which an output rod 21 extends for providing a master cylinder with an input to effect a brake application, mounting bolts 22 through which the master cylinder is attached to the brake booster and an opening 24 for receiving a check valve 26 through which the brake booster is connected to a source of vacuum. The cylindrical body 16 has a ledge or shoulder 30 adjacent the opened end 20.

The second shell 14 is essentially in the form of a disc 32 with a cylindrical section 34 located adjacent a radial peripheral surface 36. The cylindrical section 32 is folded back on itself to form a ledge 38 adjacent the peripheral surface 36. The disc 32 has an axial opening 40 through which a cylindrical projection 42 of a hub 44 extends and is equip with mounting studs 48,48' for attaching the brake booster 10 to wall in a vehicle.

In connecting the front shell 12 to the rear shell 14 a first bead 100 on a diaphragm 102 is located between shoulder 30 and ledge 38 such that a fluid tight joint is formed when tabs 13, 13' . . . 13" are deformed inwardly against peripheral surface 36. Diaphragm 102 has a second bead 104 that is retained in an annular groove 70 formed adjacent the peripheral surface 72 of a backing plate 74 carried on hub 44. The diaphragm 102, backing plate 74 and hub 44 define a movable wall 76 within the housing that separates the interior into a front chamber 50 and a rear chamber 52.

Hub 44 has an axial bore 54 that retains a valve assembly 56. Valve assembly 56 is designed to respond to an input force applied to push rod 58 to interrupt the connection of the rear chamber 52 with source of vacuum available through check valve 26 to the front chamber 50 and open communication between the rear chamber 52 and the surrounding environment. With the rear chamber 52 connected to the environment, a pressure differential is created across the movable wall 76 such that after overcoming return spring 79, an output force develops to move the movable wall 76 toward the front chamber 12 and provide an output force that acts on a master cylinder to effect a brake application. The structure of brake booster 10 with the exception of diaphragm 102 and functionality thereof is essentially the same as the structure disclosed in U.S. Pat. No. 6,390,567 as the diaphragm 102 allows the movable wall 76 to freely move axially within the interior of the housing formed by joining shell 12 to shell 14.

Figure 4:
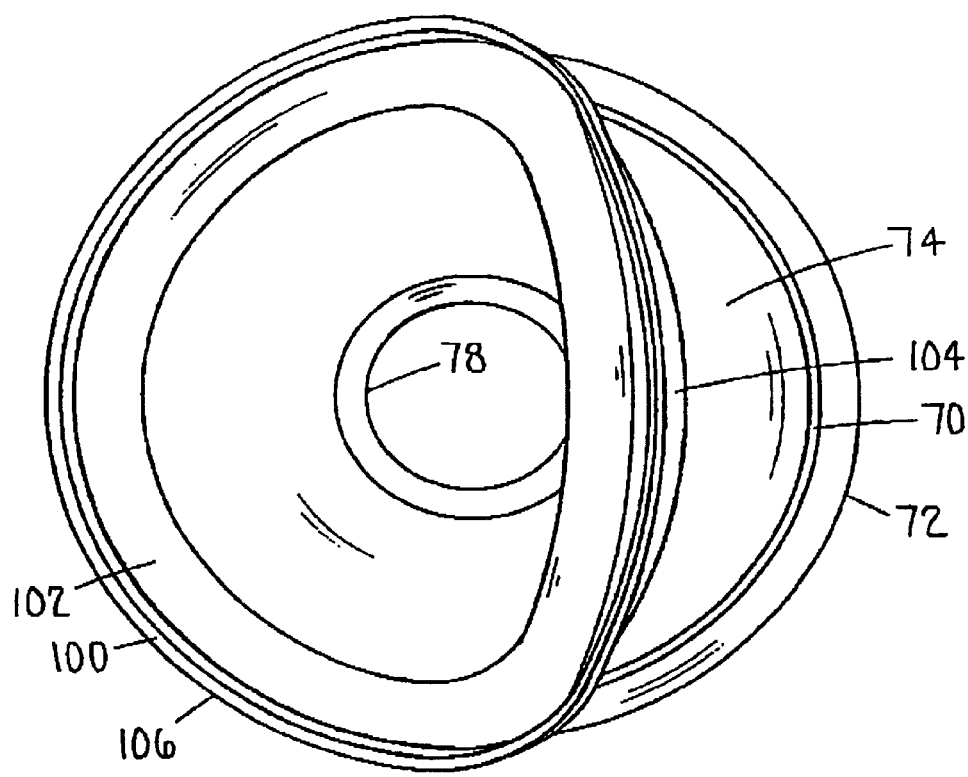
FIG. 4 is a top view of the diaphragm and backing plate of FIG. 3.
Figure 3:
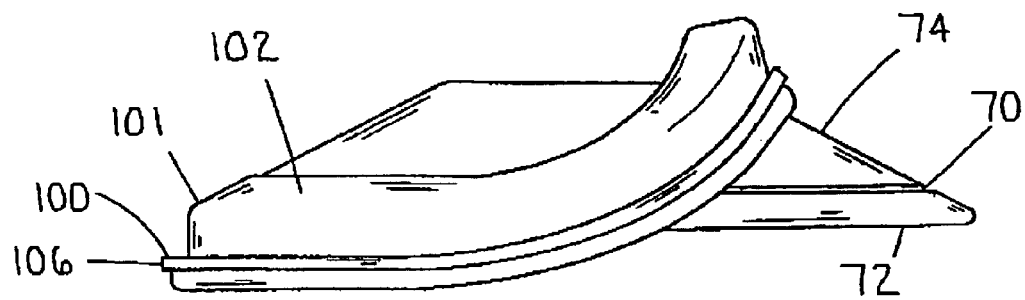
FIG. 3 is an illustration showing the placement of the diaphragm on a backing plate of the movable wall.

In more particular detail, diaphragm 102 and its relationship with backing plate 74 is best-illustrated in FIGS. 2, 3 and 4. Diaphragm 102 has an oval body 116 wherein a first bead 100 is located on an outer peripheral surface defined by a first end 106 and a second bead 104 located on an inner peripheral surface defined by a second end 108. The first end 106 and correspondingly the first bead 100 and the second end 108 and correspondingly the second bead 104 each have an oval shape. The oval shape being defined therein during molding whereby an elastomeric material is injected into a central location such that the resulting product is without a seam from the inner surface to the outer surface of the resulting diaphragm 102. After molding, the material defined by area 200 is cut away from the molded product as the first bead 100 and second bead 104 are trimmed to define a diaphragm 102 as illustrated in FIG. 2.

Method of Assembly

The manufacture of a brake booster 10 having an essentially circular housing is produced by joining a first shell 12 to a second shell 14 wherein a diaphragm 102 made accordance with the principles of the present invention is located between a shoulder 30 and peripheral surface 36 to seal the interior from the surrounding environment while separating the interior into a front chamber 50 and a rear chamber 52 through the following steps in an assembly process.

A diaphragm 102 is obtained from a source of supply and manufacture in a manner such that an oval body section 116 has a first end 106 with a first bead 100 thereon and a second end 108 with a second bead 104 thereon. The oval body section 116 has a uniform axial thickness that extends from the first bead 100 to the second 104 bead but a proportional greater thickness from a minor axis to a major axis with a greater thickness along the minor axis;

- a disc or backing plate 74 is obtained from a source of supply. The disc 74 has an outer diameter or peripheral surface 72 that is concentric to the circular shape of cylindrical section 34 of shell 14, an inner diameter 78 that matches ledge 43 on hub 44, and an annular groove 70 located adjacent the outer diameter 74;
- the second bead 104 of diaphragm 102 is stretched from its molded oval shape to a circular shape and sequentially inserted into annular groove 70, as illustrated in FIGS. 3 and 4.
- once bead 104 is inserted into annular groove 70, the material forming the groove 70 may be deformed or pinched to assist in holding the bead 104 in place;
- a force is thereafter applied to the first end 106 of diaphragm 102 such surface 101 is brought into contact with peripheral surface 72 to hold body section 116 in an essentially circular shape, as illustrated for the brake booster 10 in FIG. 1;
- the inner diameter 78 of disc 74 is thereafter placed on ledge 43 of hub 44 such that edge 75 sealingly engages shoulder 41 on the hub 44;
- thereafter, the hub 44 with diaphragm 102 attached thereto is placed in a fixture 400 as shown in FIG. 1 such that cylindrical projection 42 of a hub 44 extends through opening 40 in shell 14 into the surrounding environment;
- the first bead 100 is stretched from its molded oval shape to a circular shape and positioned on a ledge 38 of the second shell 14;
- a return spring 79 is located between hub 44 and the first shell 12;
- a force F, is applied by fixture 402 to move the first shell 12 toward the second shell 14 such that a first peripheral surface on the first shell 12 engages the first bead 100 and compresses the first bead 100 between shoulder 30 and the peripheral surface 36 on the second shell 14; and
- once bead 100 is compressed, the peripheral surfaces 13, 13' . . . 13" on the opened end 20 of shell 12 are deformed into engagement peripheral surface 36 on shell 14 to define a joint and sealing the interior from the surrounding environment to define a brake booster 10.

The resulting brake booster 10 when installed in vehicle functions in a manner as described above to supply a master cylinder with an input force to effect a brake application.

In order to assure that the movable wall 76 is not adversely effected by uneven stretching of the oval diaphragm 102 with respect to the circular backing plate 74, the oval diaphragm 102 was modified in a manner as illustrated in FIG. 5 by diaphragm 202.

Diaphragm 202 has oval body 216 with a first section 215 that transitions into a first bead 200 on a first end 206 and a second section 217 that transitions into a second bead 204 on a second end 208. The second section 217 has a contour shape along a major axis that approaches a diameter of the annular groove 70 on backing plate 74 and along a minor axis that is less than the diameter of the annular groove 70. However, once the second bead 204 is inserted into the annular groove 70 on backing plate 74 and surface 201 is brought against peripheral surface 72 on backing plate 74 the oval body 216 has an essentially cylindrical shape that is perpendicular to peripheral surface 72. The cylindrical shape is enhanced by locating bead 200 on ledge 38 as the oval shape of bead is stretched into a circular shape and as a result tension is not placed on the resulting cylindrical section 216 that would effect smooth movement of the movable wall 76.

I claim:

1. A brake booster (10) having a first shell (12) joined to a second shell (14) by deforming a first peripheral surface (13) on the first shell (12) with respect to a second peripheral surface (36) on the second shell (14) to compress a first bead (100, 200) on a diaphragm (102,202) secured to a movable wall (76) to define a housing while sealing an interior thereof from the surrounding environment to create a front chamber (50) and a rear chamber (52) within the housing, said movable wall (76) carrying a valve arrangement (56) that responds to a brake input to interrupt communication between said front chamber (50) and said rear chamber (52)

and thereafter open communication between said rear chamber (52) and the surrounding environment to create a pressure differential across said movable wall (76) to develop an output force for effecting a brake application, said movable wall (76) being characterized by a disc (74) having an annular groove (70) located adjacent a peripheral surface (72) and said diaphragm (102,202) being characterized by a cylindrical body (116,216) having said first bead 100,200) on a first end (106,206) and a second bead (104,204) on a second end (108,208), said first bead (100,200) and said second bead (204,204) each having an initial oval shape, said first bead oval shape being stretched into a circular shape for retention between said first and second peripheral surfaces while said second bead oval shape being stretched into a circular shape for retention in said annular groove (70) to define a connection between said movable wall (76) and said first (13) and second (36) peripheral surfaces in sealing said front chamber (50) from said rear chamber (52).

2. The brake booster as recited in claim 1 wherein said diaphragm is further characterized by said cylindrical body (216) having a first section (215) that transitions from said first bead (200) and a second section (217) that transitions from said second bead (204), said second section (217) having a contour shape with a diameter along a major axis that approaches a diameter of said annular groove (70) and along a minor axis with a diameter that is less than the diameter of said annular groove (70) such that on insertion of said second bead (204) into said annular groove (70) said cylindrical body (216) is substantially perpendicular to a peripheral surface (72) on said disc (74).

3. The brake booster as recited in claim 2 wherein said first section (215) of said cylindrical body (216) is characterized having a contour shape with a diameter along a major axis and a minor axis that is equal to the diameter of said ledge (38) such that a contour shape going from a oval shape to said circular shape does not place tension on the cylindrical body (216) during movement of said moveable wall (76) within said housing.

4. A method of manufacturing a brake booster (10) having an essentially circular housing defined by joining a first shell (12) to a second shell (14), comprising the steps of:

obtaining a diaphragm (102,202) from a source of supply, said diaphragm (102,202) having an oval body section with a first bead (100) on a first end (106) and a second bead (104) on a second end (108), said first (102,202) and second (104,204) beads each having an oval shape;

obtaining a disc (74) from a source of supply, said disc (74) having an outer diameter (72) concentric to said circular housing and an inner diameter (78), said disc (74) having an annular groove (70) located adjacent said outer diameter (72);

stretching said second bead (104,204) from said oval shape to a circular shape while inserting said second bead (104,204) into said annular groove (70) on said disc (74);

locating said inner diameter (78) of said disc (74) adjacent a shoulder (41) on a hub (44);

locating said hub (44) in said second shell (14) such that a portion (42) thereof extends through an opening (40) and into the surrounding environment;

stretching said first bead (100,200) from said oval shape to a circular shape to position said first bead (100,200) on a ledge (38) on said second shell (14);

locating a spring (79) between said hub (44) and said first shell (12);

applying a force (F) to move said first shell (12) toward said second shell (14) such that a first peripheral surface (30) on the first shell (10) engages said first bead (100,200) and compresses said first bead (100, 200) between said first peripheral surface (30) and a second peripheral (36) surface on said second shell (14); and deforming a portion (13) of said first peripheral surface (30) into engagement with said second peripheral surface (36) define a seal the interior of said housing from the surrounding environment while separating the interior thereof into a front chamber (50) and a rear chamber (52).

5. The method as recited in claim 4 wherein said step of obtaining said diaphragm (102,202) includes the step of selecting a diaphragm (202) that includes a central cylindrical section (216) with a first transition section (215) that connects to said oval shape of said first bead (200) and a second transition section (217) that connects to said oval shape of said second bead (204), said first (215) and second (217) transition sections each having an apex along a minor axis of said oval shape such that in said step of respectively stretching said first and second beads for insertion into said ledge (38) and annular groove (70) said central cylindrical section (216) is not stretched to an extent that axial movement of said disc (74) within said interior is hampered.

6. The method as recited in claim 5 further including the step of: deforming said annular groove (70) to assist in retaining said second bead (104,204).

7. A brake booster (10) as defined by said method of claim 5.

8. A brake booster having a first shell joined to a second shell by deforming a first peripheral surface on the first shell with respect to a second peripheral surface on the second shell to compress a first bead on a diaphragm secured to a movable wall to define a housing while sealing an interior thereof from the surrounding environment to create a front chamber and a rear chamber within the housing, said movable wall carrying a valve arrangement that responds to a brake input to interrupt communication between said front chamber and said rear chamber and thereafter open communication between said rear chamber and the surrounding environment to create a pressure differential across said movable wall to develop an output force for effecting a brake application, said movable wall being characterized by a disc having an annular groove located adjacent a peripheral surface and said diaphragm being characterized by a cylindrical body having said first bead on a first end and a second bead on a second end, second bead having an initial oval shape that is stretched into a circular shape for retention in said annular groove to define a connection between said movable wall and said first and second peripheral surfaces in sealing front chamber from said rear chamber.

9. The brake booster as recited in claim 8 wherein said cylindrical body is characterized by a first transition section that joins a center section to said second bead, said first transition section having a contour with a diameter along a major axis that approaches a diameter of said annular groove and a diameter along a minor axis that is less than said diameter of said annular groove such that on insertion of said second bead into said annular groove said center section is perpendicular to said disc.

10. The brake booster as recited in claim 9 wherein said contour in going from a circular shape to said oval shape has an apex at said minor axis and as a result engagement with a peripheral surface on said movable wall tension is not placed on said circular section that would effect smooth movement of the movable wall.

* * * * *